United States Patent [19]

Hanson et al.

[11] 4,063,834
[45] Dec. 20, 1977

[54] BALL JOINT ASSEMBLY

[75] Inventors: William Michael Hanson; Basil Robert Price, both of Leamington Spa, England

[73] Assignee: Automotive Products Limited, England

[21] Appl. No.: 782,563

[22] Filed: Mar. 29, 1977

[30] Foreign Application Priority Data

Apr. 2, 1976 United Kingdom .............. 13360/76

[51] Int. Cl.² ............................................. F16C 11/06
[52] U.S. Cl. ................................. 403/138; 280/95 R; 180/148
[58] Field of Search .................... 403/76, 77, 138, 144, 403/135, 122, 132, 140; 280/674, 95 R; 180/148, 147

[56] References Cited

U.S. PATENT DOCUMENTS

| | | | |
|---|---|---|---|
| 3,693,999 | 9/1972 | Wood, Jr. | 403/140 X |
| 3,871,469 | 3/1975 | Millard | 180/148 |

Primary Examiner—Andrew V. Kundrat
Attorney, Agent, or Firm—Kemon & Estabrook

[57] ABSTRACT

A ball joint assembly includes a socket member secured in a housing (e.g. a steering rack), and a bearing member having bearing surfaces for co-operating with the head of a ball pin. The bearing member is biassed by an anti-rattle spring which reacts against the housing to keep the bearing surfaces in contact with the ball pin but is non-releasably retained in the socket member to prevent unskilled attempts to compensate for wear by shimming.

4 Claims, 2 Drawing Figures

BALL JOINT ASSEMBLY

The invention relates to ball joint assemblies, particularly, but not exclusively, for use as rack end joints in motor vehicles with rack-and-pinion steering gear.

Figure 1:
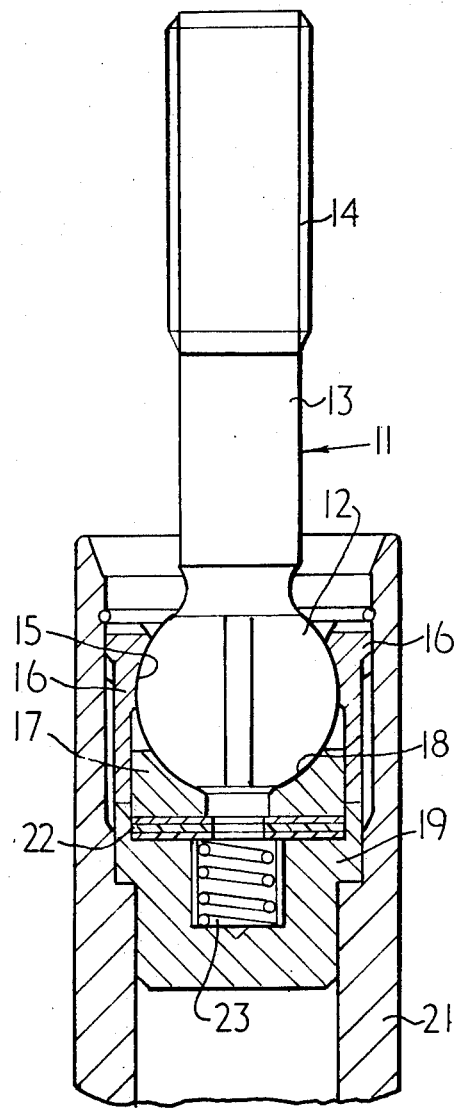
Figure 2:
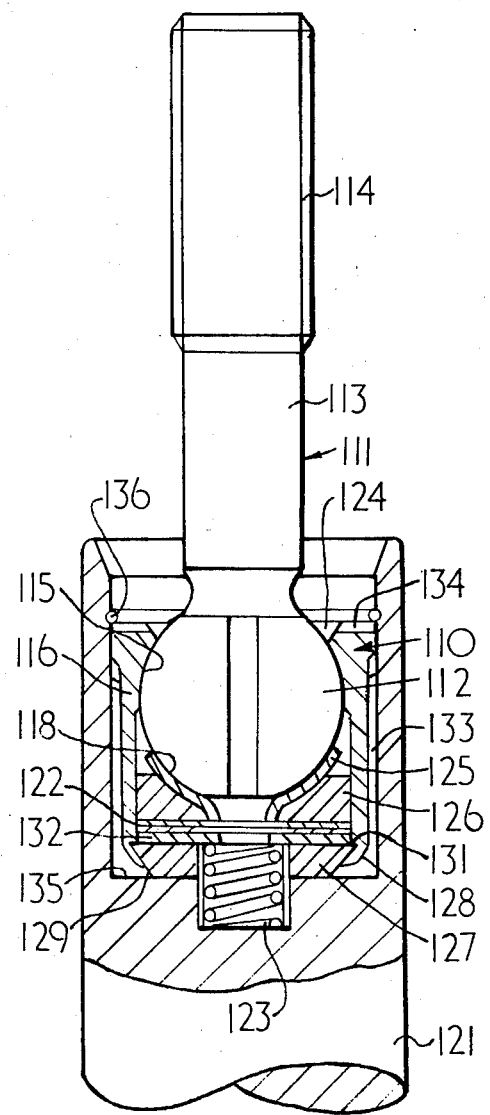

FIGS. 1 and 2 are sectional views of ball joint assembly of the prior art and of the invention.

FIG. 1 of the accompanying drawings is a sectional elevation of a known ball joint which comprises a ball pin 11 having a part-spherical head 12 and a cylindrical shank 13 including a threaded portion 14. The head 12 bears on an annular bearing surface 15 formed in an externally threaded socket member 16. A bearing member 17 having a second bearing surface 18 is located in the socket member 16 and is movable towards the annular bearing surface 15 in response to wear of the parts. The socket member 16 is screwed down onto an abutment formed by a plug 19 located in a stepped bore in a steering rack 21. The larger diameter portion of the stepped bore is threaded for the socket member 16. Shims 22 between the plug 19 and the bearing member 17 control the total clearance or preload between the plug 19, the bearing member 17, the ball pin head 12 and the annular bearing surface 15, and an anti-rattle spring 23 urges the shims and bearing member 17 away from the plug 19 as the parts wear.

After considerable use the socket member 16 can be unscrewed to replace the worn parts. However, some mechanics do not renew the ball pin but attempt to compensate for wear by adding to the thickness of shims 22. This can be reasonably satisfactory if wear is not severe, but the tendency is to the head 12 to wear unevenly so that its rubbing surfaces are not truly spherical. Hence, when shims are added to eliminate clearance with the shank 11 aligned with the rack 21, there is the tendency for the ball pin 11 to bind when it is tilted over to the extremes of its range of pivotal movement. The resulting bending stresses cause fatigue failure of the ball pin which is obviously very dangerous in a vital steering component of a motor vehicle.

It is therefore an object of the invention to provide a ball joint assembly which can be renewed without the need for shim adjustment by the vehicle mechanic.

The invention provides a ball joint assembly for connecting one component to another component for relative rotational and pivotal movement, the assembly comprising a ball pin received in a socket member, an annular bearing surface in the socket member defining an aperture through which the shank of the ball pin extends, a bearing member in the socket member having a second bearing surface thereon, said bearing surfaces locating the ball pin against linear movement relative to the socket member whilst permitting relative rotational and pivotal movement, wherein the bearing member is capable of movement towards said annular bearing surface in response to wear and is prevented by the socket member from movement away from said annular bearing surface beyond a pre-set position by non-releasable means, the socket of the assembly being adapted to be attached to said one component in such a way that an anti-rattle spring can react between said one component and the bearing member to urge the bearing member towards said annular bearing surface and maintain said bearing surfaces in contact with the ball pin.

The invention will now be described with reference to FIG. 2 of the accompanying drawings, which shows a cross-sectional elevation of a ball joint assembly according to the invention.

The ball joint assembly 110 comprises a ball pin 111 having a part-spherical head 112 and a cylindrical shank 113 including a threaded portion 114 for connection to a steering rod of a vehicle. The head 112 bears on an annular bearing surface 115 formed in an externally threaded tubular socket member 116, the annular bearing surface 115 defining an aperture 124 through which the shank 113 extends. A steel bearing member 125 having a second bearing surface 118 is located in the socket member 116 by a support ring 126 of a resilient temperature resistant plastics material, the support ring 126 and bearing member 125 being movable towards the annular bearing surface 115 in response to wear of the head 112 and its associated bearing surfaces 115 and 118.

The bearing member 125 and support ring 126 are prevented from movement away from the annular bearing surface 115 by means of a cap 127. This cap 127 is held non-releasably fast with the socket member 116 by peening over an end portion 128 of the socket member onto a large chamfer 129 on the outer edge of the cap 127, a step 131 in the socket member locating and supporting the cap 127 during the peening operation and providing the bearing member 125 with a pre-set position. Shims 122 and a washer 132 which are a sliding fit in the socket member 116 set a preload of the bearing surfaces 115, 118 on the head 112.

The ball joint assembly 110 comprising the parts referred to above is adapted to be screwed into a threaded bore 133 in a housing comprising the end of a steering rack 121 by means of driving slots 134 so that the cap 127 abuts hard against the base 135 of the bore. A nylon patch on the threads of the socket member 116 helps to prevent unscrewing and a round wire circlip 136 is used for added security.

The cap 127 is apertured and the base 135 is bored to receive an anti-rattle spring 123 which can react between the rack 121 and the washer 132 to bias the bearing member 125 towards the annular bearing surface 115 and maintain the bearing surfaces 115 and 118 in contact with the ball pin head 112 as wear occurs.

When wear of the ball pin head 112 and bearing surfaces 115 and 118 is such that parts replacement is necessary, the old ball joint assembly 110 is unscrewed and is replaced by a new assembly. The selection of shims 122 is performed during manufacture, so that no special skill is needed by the vehicle mechanic.

In another embodiment of the invention, the bearing member 116 and support ring 126 are replaced by a bearing member similar to bearing member 16 of the known design. In a further embodiment the ball pin head is of the known type having part-spherical surfaces of different radii so that the surface which contacts the bearing surface 118 is of smaller radius than the surface which contacts the annular bearing surface 115. The cap 127 may be secured to the socket member 116 by welding instead of peening.

The invention may be applied to all ball joints where problems similar to those of the known joint are likely to be found, for example those used in vehicle suspensions.

We claim:
1. A ball joint assembly comprising:
   a housing;
   a socket member secured in the housing;

a ball pin received in the socket member, the ball pin comprising a shank and a head having a part-spherical surface thereon;

a first, annular, bearing surface in the socket member co-operating with said part-spherical surface and defining an aperture through which the shank of the ball pin extends;

a bearing member in the socket member co-operating with said part-spherical surface and having a second bearing surface thereon, said bearing member being movable towards said annular bearing surface in response to wear; means non-releasably secured to the socket member adjacent said bearing member to prevent movement of said bearing member away from said annular bearing surface beyond a pre-set position;

and an anti-rattle spring acting between said housing and said bearing member to urge said bearing member towards said annular bearing surface and maintain said bearing surfaces in contact with the part-spherical surface of the ball pin.

2. The ball joint of claim 1 wherein said non-releasable means comprises a cap secured to the socket member and apertured to receive the anti-rattle spring.

3. The ball joint of claim 2 wherein the cap is secured to the socket member by peening.

4. The ball joint of claim 2 further comprising shims interposed between said bearing member and the cap.

* * * * *